United States Patent
Zhao et al.

(10) Patent No.: US 10,776,825 B2
(45) Date of Patent: Sep. 15, 2020

(54) HYBRID EVENTING SYSTEM

(71) Applicant: salesforce.com, inc., San Francisco, CA (US)

(72) Inventors: Yingwu Zhao, Lafayette, CA (US); Hal Scott Hildebrand, Moss Beach, CA (US); Lawrence McAlpin, Bloomington, IN (US); Alex Warshavsky, Walnut Creek, CA (US)

(73) Assignee: salesforce.com, inc., San Francisco, CA (US)

( * ) Notice: Subject to any disclaimer, the term of this patent is extended or adjusted under 35 U.S.C. 154(b) by 156 days.

(21) Appl. No.: 16/037,261

(22) Filed: Jul. 17, 2018

(65) Prior Publication Data
US 2020/0027126 A1 Jan. 23, 2020

(51) Int. Cl.
*G06Q 30/02* (2012.01)
*H04L 29/08* (2006.01)

(52) U.S. Cl.
CPC ..... *G06Q 30/0258* (2013.01); *G06Q 30/0257* (2013.01); *H04L 67/26* (2013.01)

(58) Field of Classification Search
CPC .................................................... G06Q 30/02
See application file for complete search history.

(56) References Cited

U.S. PATENT DOCUMENTS

| 7,580,862 | B1 * | 8/2009 | Montelo | G06Q 10/10 |
| | | | | 705/26.1 |
| 2003/0147369 | A1 * | 8/2003 | Singh | H04L 1/0007 |
| | | | | 370/338 |
| 2004/0068481 | A1 * | 4/2004 | Seshadri | G06F 16/9535 |
| 2009/0182610 | A1 | 7/2009 | Palanisamy | |
| 2009/0282051 | A1 | 11/2009 | Meyer | |
| 2010/0017292 | A1 | 1/2010 | Dominowska | |
| 2011/0060643 | A1 * | 3/2011 | Davis | G06Q 30/02 |
| | | | | 705/14.41 |
| 2011/0307948 | A1 | 12/2011 | Ranjan | |

(Continued)

FOREIGN PATENT DOCUMENTS

KR 100752133 B1 8/2007

OTHER PUBLICATIONS

Wikipedia; Sales Force Management System, Jun. 1, 2018, pp. 1-5; https://en.wikipedia.org/wiki/Sales_force_management_system.

(Continued)

*Primary Examiner* — Vincent M Cao
(74) *Attorney, Agent, or Firm* — Butzel Long

(57) ABSTRACT

A processor can cause a first communication, to a user device, of a first item based on an eventing system being in a first mode, a configuration to cause the eventing system to cause, without a request from the user device, a communication of an item to the user device in response to an entry of the item into a memory. After the first communication, the processor can cause the eventing system to be in a second mode, a configuration to cause the eventing system to refrain from communications of items to the user device. The processor can receive, from the user device, a signal to cause the eventing system to switch from the second mode to the first mode. After receiving the signal, a second item can be entered into the information memory. The processor can cause a second communication, to the user device, of the second item.

24 Claims, 12 Drawing Sheets

(56) References Cited

U.S. PATENT DOCUMENTS

| | | | |
|---|---|---|---|
| 2012/0086544 A1* | 4/2012 | Kemp | G06F 9/5072 340/5.1 |
| 2012/0290377 A1 | 11/2012 | Itani | |
| 2015/0007239 A1 | 1/2015 | Cranman | |
| 2015/0227981 A1 | 8/2015 | Nam | |
| 2016/0110400 A1 | 4/2016 | Greene | |
| 2017/0024410 A1* | 1/2017 | Pola | G06F 16/178 |
| 2018/0129694 A1 | 5/2018 | Hoffner | |

OTHER PUBLICATIONS

International Search Report and Written Opinion for Application No. PCT/US2019/041855, dated Oct. 25, 2019, 11 pages.

\* cited by examiner

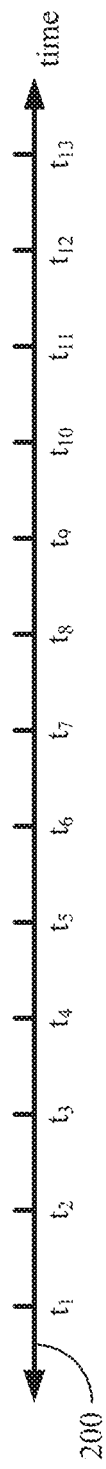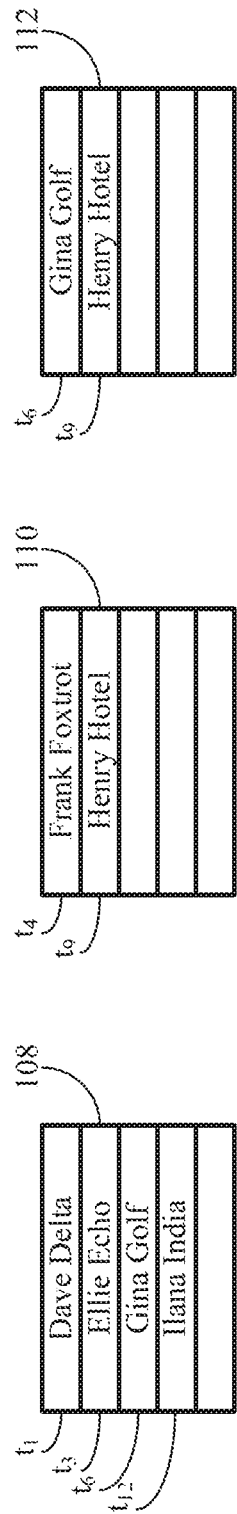

FIG. 7

| Anne Alpha | | | | |
|---|---|---|---|---|

| Brian Bravo | | | | |
|---|---|---|---|---|
| Cindy Charles | | | | |

| Cindy Charles | | | | |
|---|---|---|---|---|

| Subscribers | Topic #1 | Topic #2 | Topic #3 |
|---|---|---|---|
| Anne Alpha | 1 | 0 | 0 |
| Brian Bravo | 0 | 1 | 0 |
| Cindy Charles | 0 | 1 | 1 |

136

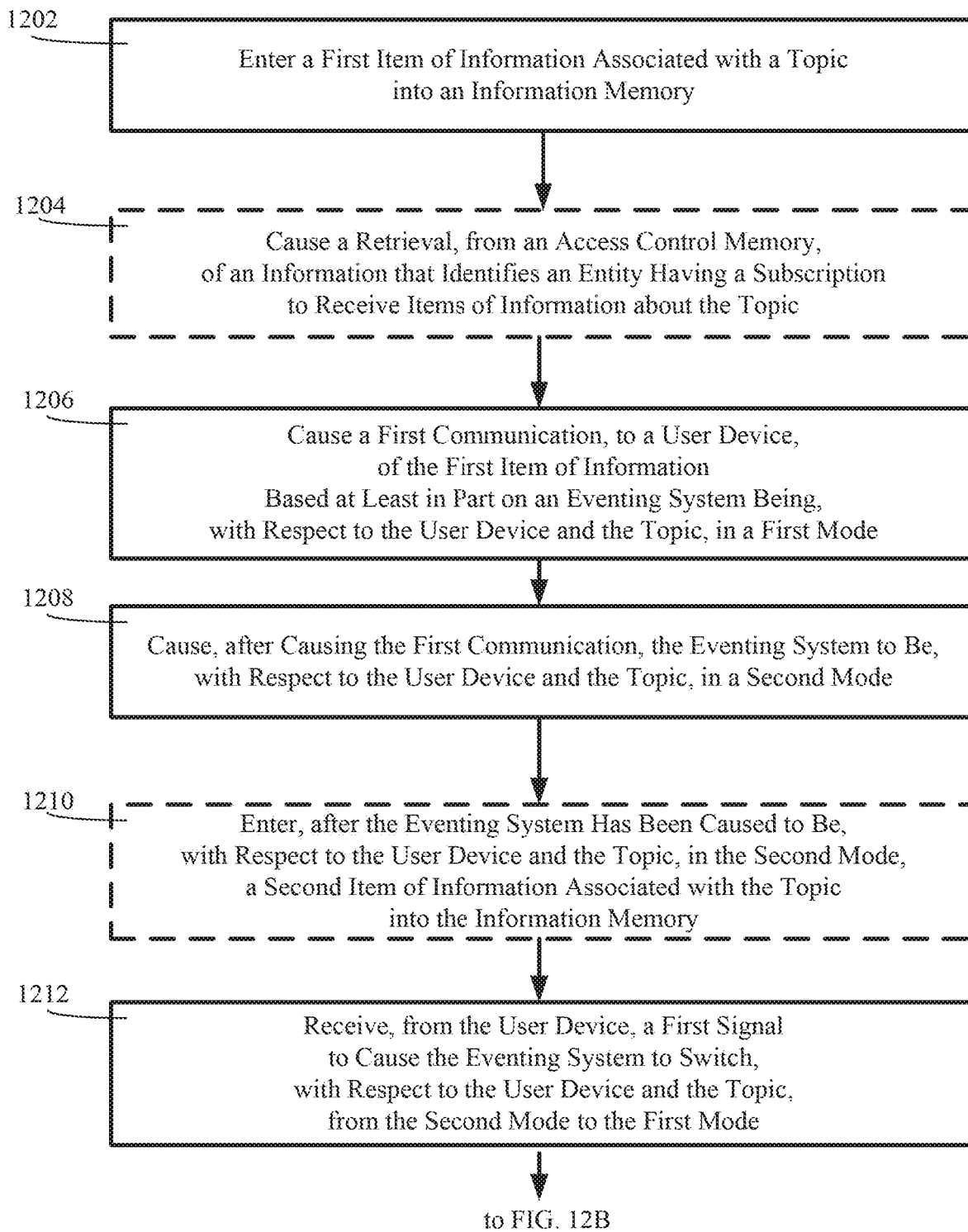

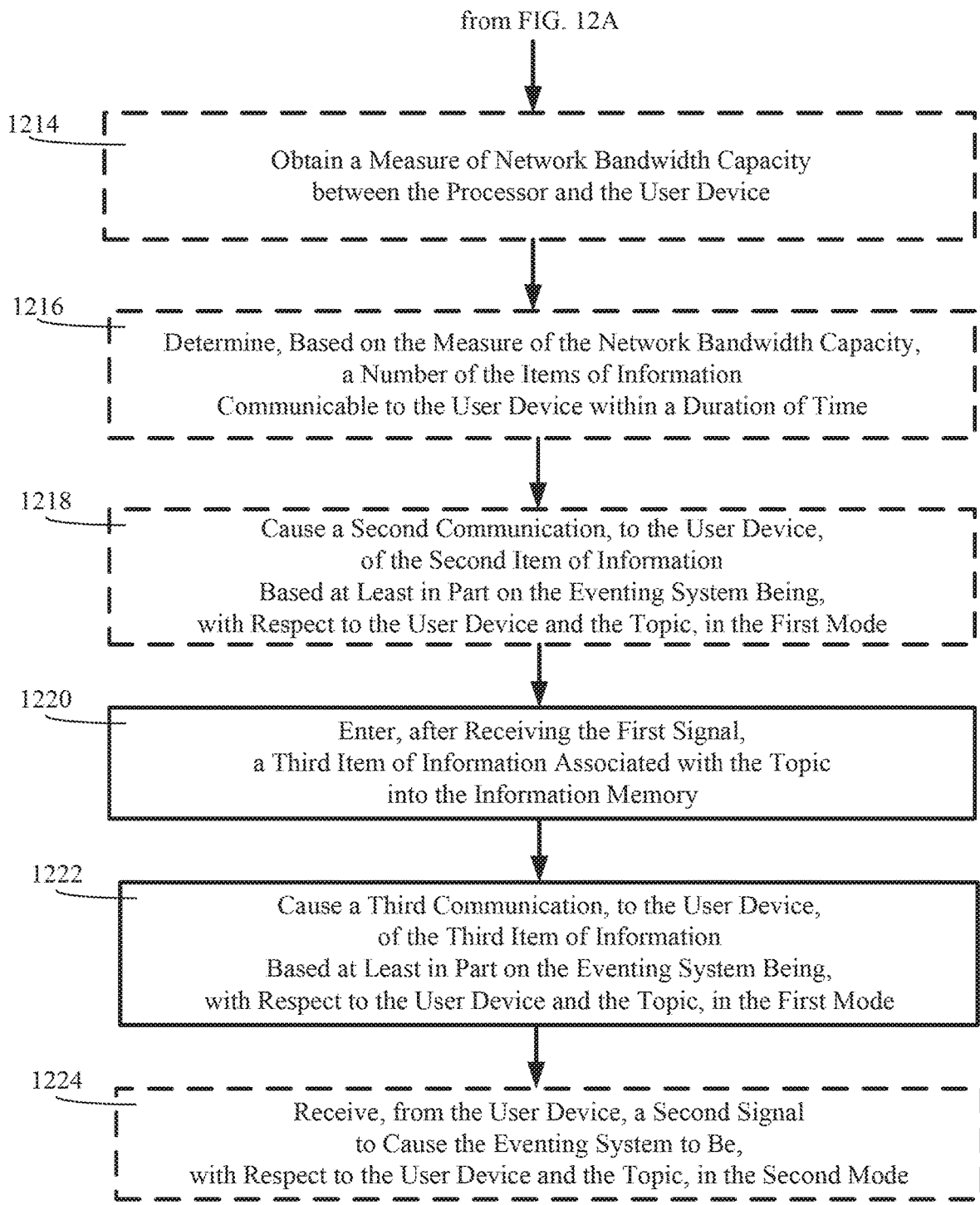

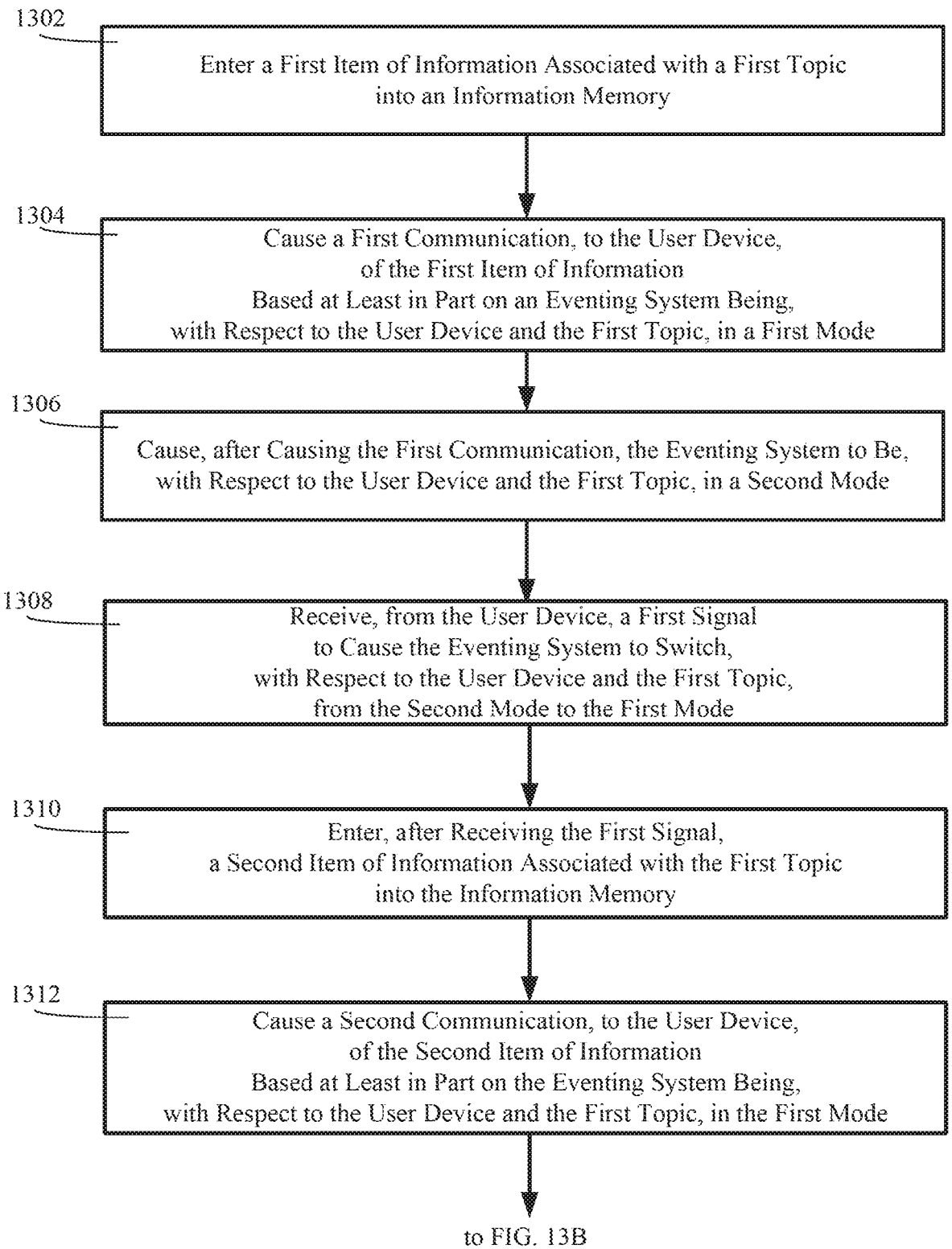

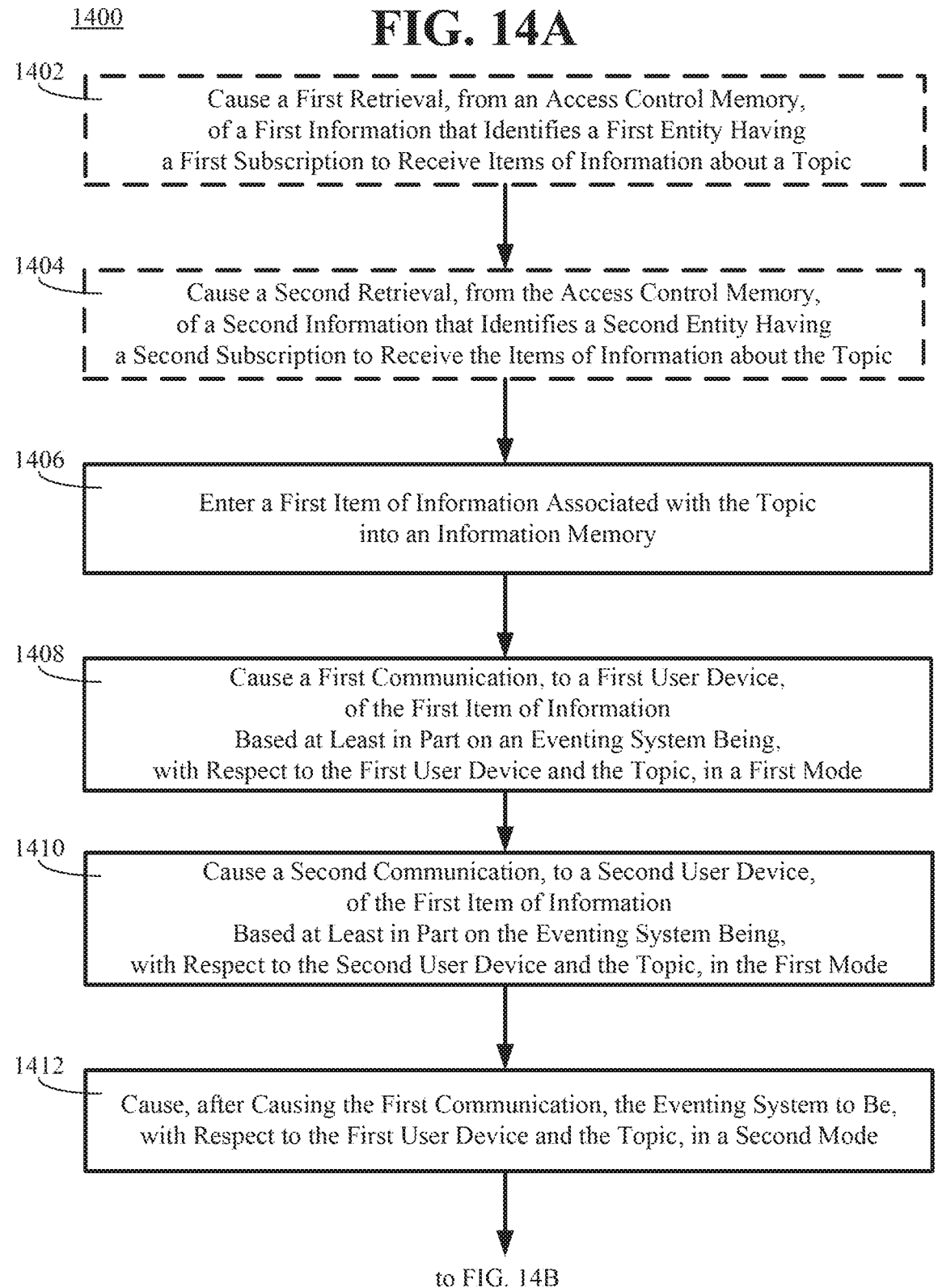

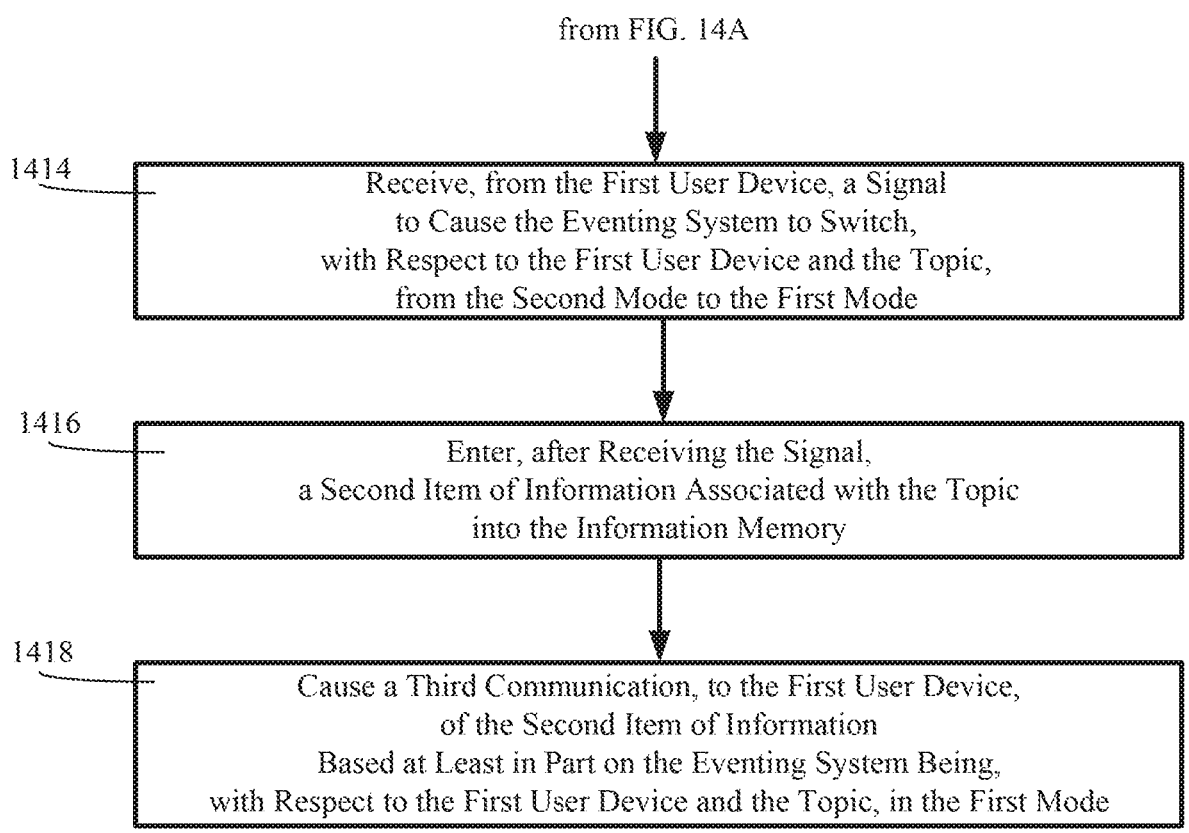

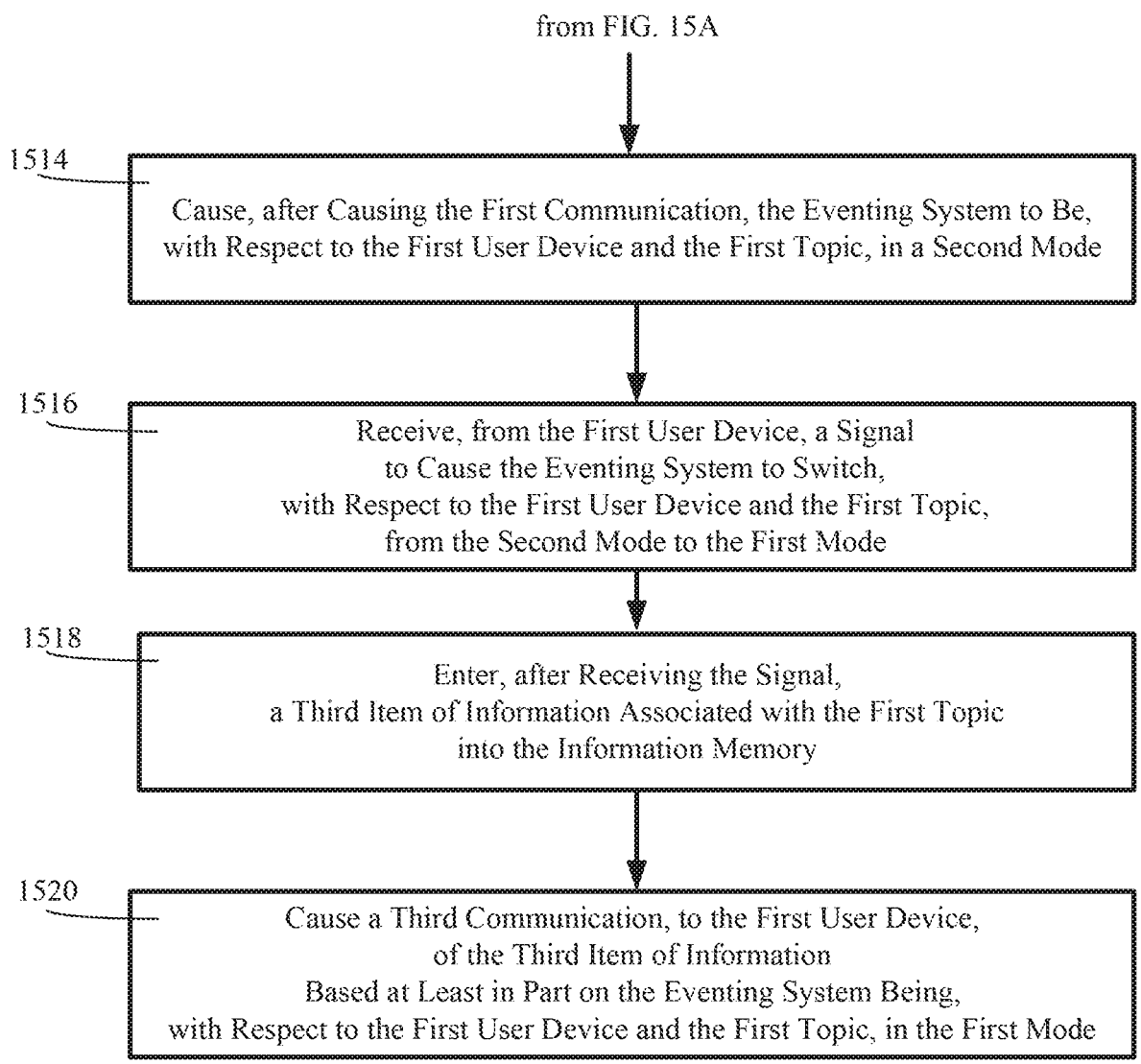

HYBRID EVENTING SYSTEM

BACKGROUND

An eventing system can be a component of a customer relationship management system. An entry of an item of information about a topic (e.g., a sales lead for a potential buyer of a particular part) into an information memory of the eventing system can be referred to as an event. Information in an access control memory of the eventing system can be used to identify an individual having a subscription to receive a notification of the event (e.g., the item of information about the topic (e.g., the sales lead for the potential buyer of the particular part)). The eventing system can be configured to communicate the notification of the event to a user device associated with the individual having the subscription.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementation of the disclosed subject matter. No attempt is made to show structural details in more detail than may be necessary for a fundamental understanding of the disclosed subject matter and the various ways in which it can be practiced.

FIG. 2 is a diagram of a timeline with example points in time associated with operations performed by an eventing system.

FIG. 3 is a diagram illustrating an example of the first information memory according to the disclosed technologies.

FIG. 4 is a diagram illustrating an example of the second information memory according to the disclosed technologies.

FIG. 5 is a diagram illustrating an example of the third information memory according to the disclosed technologies.

FIG. 6 is a diagram illustrating an example of a configuration of the information memory according to the disclosed technologies.

FIG. 7 is a diagram illustrating an example of the first access control memory according to the disclosed technologies.

FIG. 8 is a diagram illustrating an example of the second access control memory according to the disclosed technologies.

FIG. 9 is a diagram illustrating an example of the third access control memory according to the disclosed technologies.

FIG. 10 is a diagram illustrating an example of a configuration of the access control memory according to the disclosed technologies.

FIGS. 12A and 12B are a flow diagram illustrating an example of a method for communicating items of information according to the disclosed technologies.

FIGS. 13A and 13B are a flow diagram illustrating another example of a method for communicating items of information according to the disclosed technologies.

FIGS. 14A and 14B are a flow diagram illustrating yet another example of a method for communicating items of information according to the disclosed technologies.

FIGS. 15A and 15B are a flow diagram illustrating still another example of a method for communicating items of information according to the disclosed technologies.

DETAILED DESCRIPTION

As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

Figure 1:
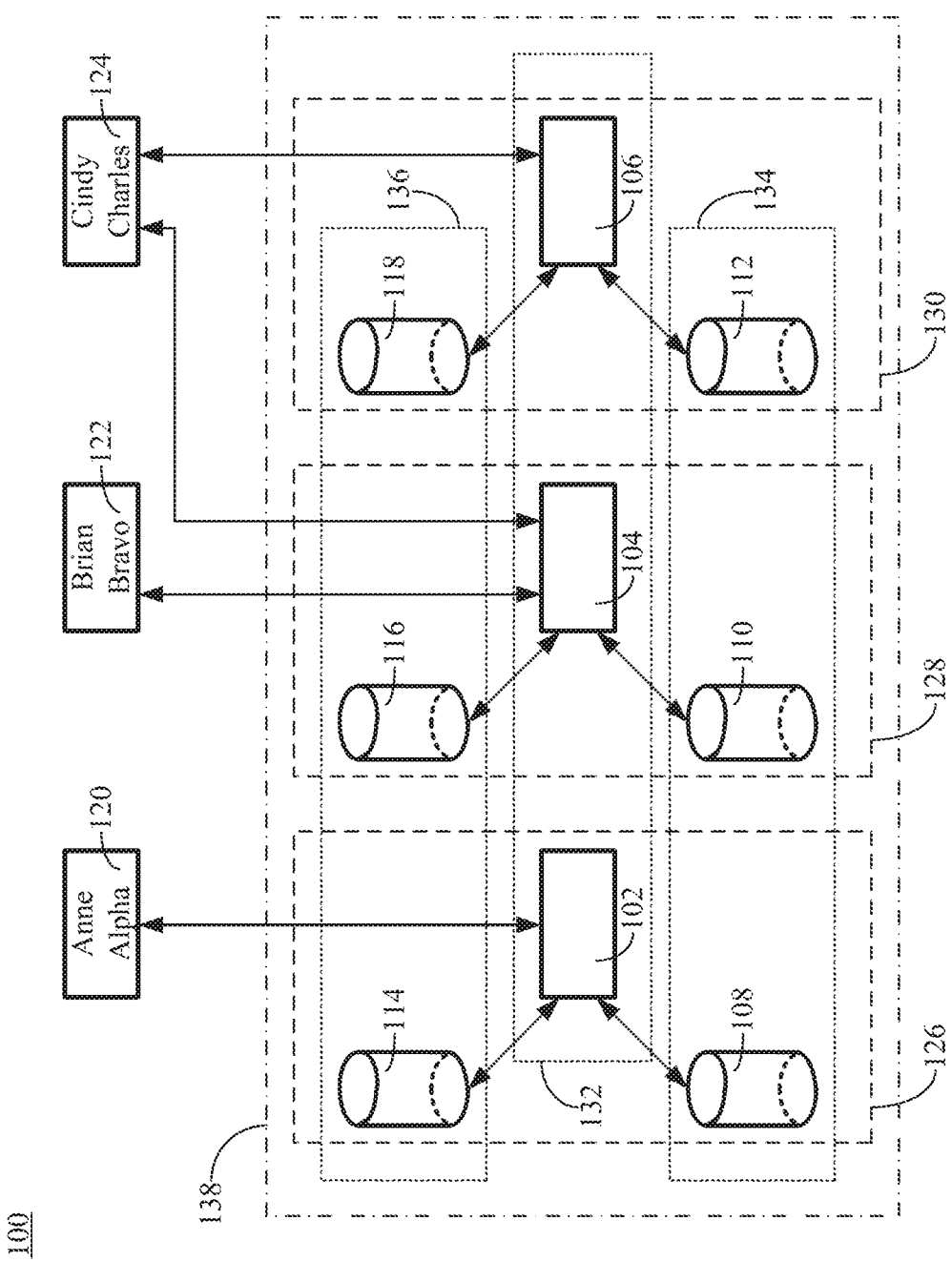
FIG. 1 is a diagram illustrating an example of an environment for an eventing system according to the disclosed technologies.

FIG. 1 is a diagram illustrating an example of an environment 100 for an eventing system according to the disclosed technologies. For example, the environment 100 can include a first processor 102, a second processor 104, a third processor 106, a first information memory 108, a second information memory 110, a third information memory 112, a first access control memory 114, a second access control memory 116, a third access control memory 118, a first user device 120, a second user device 122, and a third user device 124.

The first processor 102 can be configured to communicate with the first user device 120, the second user device 122, and the third user device 124. The second processor 104 can be configured to communicate with the first user device 120, the second user device 122, and the third user device 124. The third processor 106 can be configured to communicate with the first user device 120, the second user device 122, and the third user device 124.

The first user device 120 can be configured to communicate with the first processor 102, the second processor 104, and the third processor 106. The second user device 122 can be configured to communicate with the first processor 102, the second processor 104, and the third processor 106. The third user device 124 can be configured to communicate with the first processor 102, the second processor 104, and the third processor 106.

Communication between any of the first processor 102, the second processor 104, and the third processor 106 and any of the first user device 120, the second user device 122, and the third user device 124 can be performed, for example, in a telecommunications network configured to allow computers to exchange data. Connections between any of the first processor 102, the second processor 104, and the third processor 106 and any of the first user device 120, the second user device 122, and the third user device 124 can be established using cable media, wireless media, or both. Data traffic can be organized according to a variety of communications protocols including, for example, the Internet Protocol Suite (Transmission Control Protocol/Internet Protocol (TCP/IP)), the Institute of Electrical and Electronics Engineers (IEEE) 802 protocol suite, the synchronous optical networking (SONET) protocol, the Asynchronous Transfer Mode (ATM) switching technique, or any combination thereof.

An entry of an item of information about a topic into an information memory of the eventing system can be referred to as an event. Information in an access control memory of the eventing system can be used to identify an individual having a subscription to receive a notification of the event (e.g., the item of information about the topic). The eventing system can be configured to communicate the notification of the event to a user device associated with the individual having the subscription. The topic can be associated with any of a variety of subjects: news items, sales leads, etc.

The eventing system can be, for example, a component of a customer relationship management (CRM) system. For illustrative purposes, the CRM system can be for a sales force for a parts manufacturing company. For illustrative purposes, the parts manufacturing company can manufacture Part #1, Part #2, and Part #3. Part #1 can be used in the manufacture of Product A. Part #2 can be used in the manufacture of Product B and the manufacture of Product C. Part #3 can be used in the manufacture of Product C. For illustrative purposes, the eventing system can be used to assist the workflow associated with individuals pursuing sales leads for Part #1, Part #2, and Part #3.

The first processor 102, the first information memory 108, and the first access control memory 114 can be associated with a first topic (e.g., sales leads for potential buyers of Part #1). One or more of the first processor 102, the first information memory 108, and the first access control memory 114 can be combined. For example, in a configuration, the first processor 102, the first information memory 108, and the first access control memory 114 can be a first system 126 (e.g., a sales lead system for potential buyers of Part #1).

The second processor 104, the second information memory 110, and the second access control memory 116 can be associated with a second topic (e.g., sales leads for potential buyers of Part #2). One or more of the second processor 104, the second information memory 110, and the second access control memory 116 can be combined. For example, in a configuration, the second processor 104, the second information memory 110, and the second access control memory 116 can be a second system 128 (e.g., a sales lead system for potential buyers of Part #2).

The third processor 106, the third information memory 112, and the third access control memory 118 can be associated with a third topic (e.g., sales leads for potential buyers of Part #3). One or more of the third processor 106, the third information memory 112, and the third access control memory 118 can be combined. For example, in a configuration, the third processor 106, the third information memory 112, and the third access control memory 118 can be a third system 130 (e.g., a sales lead system for potential buyers of Part #3).

Alternatively or additionally, one or more of the first processor 102, the second processor 104, and the third processor 106 can be combined. For example, in a configuration, the first processor 102, the second processor 104, and the third processor 106 can be combined as a processor 132.

Alternatively or additionally, one or more of the first information memory 108, the second information memory 110, and the third information memory 112 can be combined. For example, in a configuration, the first information memory 108, the second information memory 110, and the third information memory 112 can be combined as an information memory 134.

Alternatively or additionally, one or more of the first access control memory 114, the second access control memory 116, and the third access control memory 118 can be combined. For example, in a configuration, the first access control memory 114, the second access control memory 116, and the third access control memory 118 can be combined as an access control memory 136.

For example, in a configuration, the processor 132, the information memory 134, and the access control memory 136 can be combined as an eventing system 138.

For illustrative purposes, the first user device 120 can be associated with an individual pursuing sales leads associated with manufacturers of Product A (e.g., Anne Alpha). For illustrative purposes, the second user device 122 can be associated with an individual pursuing sales leads associated with manufacturers of Product B (e.g., Brian Bravo). For illustrative purposes, the third user device 124 can be associated with an individual pursuing sales leads associated with manufacturers of Product C (e.g., Cindy Charles).

FIG. 2 is a diagram of a timeline 200 with example points in time associated with operations performed by an eventing system.

FIG. 3 is a diagram illustrating an example of the first information memory 108 according to the disclosed technologies. The first information memory 108 can be associated with the first topic (e.g., sales leads for potential buyers of Part #1). For illustrative purposes, an entry of an item of information (e.g., a sales lead (e.g., Dave Delta)) can occur at a first time (e.g., $t_1$), an entry of an item of information (e.g., a sales lead (e.g., Ellie Echo)) can occur at a second time (e.g., $t_3$), an entry of an item of information (e.g., a sales lead (e.g., Gina Golf)) can occur at a third time (e.g., $t_6$), and an entry of an item of information (e.g., a sales lead (e.g., Ilana India)) can occur at a fourth time (e.g., $t_{12}$). FIG. 4 is a diagram illustrating an example of the second information memory 110 according to the disclosed technologies. The second information memory 110 can be associated with the second topic (e.g., sales leads for potential buyers of Part #2). For illustrative purposes, an entry of an item of information (e.g., a sales lead (e.g., Frank Foxtrot)) can occur at a fifth time (e.g., $t_4$) and an entry of an item of information (e.g., a sales lead (e.g., Henry Hotel)) can occur at a sixth time (e.g., $t_9$). FIG. 5 is a diagram illustrating an example of the third information memory 112 according to the disclosed technologies. The third information memory 112 can be associated with the third topic (e.g., sales leads for potential buyers of Part #3). For illustrative purposes, an entry of an item of information (e.g., a sales lead (e.g., Gina Golf)) can occur at the third time ($t_6$) and an entry of an item of information (e.g., a sales lead (e.g., Henry Hotel)) can occur at the sixth time ($t_9$).

Alternatively, FIG. 6 is a diagram illustrating an example of a configuration of the information memory 134 according to the disclosed technologies. For illustrative purposes, an entry of an item of information (e.g., a sales lead (e.g., Dave Delta)), associated with the first topic (e.g., Part #1), can occur at a first time (e.g., $t_1$); an entry of an item of information (e.g., a sales lead (e.g., Ellie Echo)), associated with the first topic (e.g., Part #1), can occur at a second time (e.g., $t_3$); an entry of an item of information (e.g., a sales lead (e.g., Frank Foxtrot), associated with the second topic (e.g., Part #2), can occur at a third time (e.g., $t_4$); an entry of an item of information (e.g., a sales lead (e.g., Gina Golf)), associated with the first topic (e.g., Part #1) and the third topic (e.g., Part #3), can occur at a fourth time (e.g., $t_6$); an entry of an item of information (e.g., a sales lead (e.g., Henry Hotel)), associated with the second topic (e.g., Part #2) and the third topic (e.g., Part #3), can occur at a fifth time (e.g., $t_9$), and an entry of an item of information (e.g., a sales lead (e.g., Ilana India)), associated with the first topic (e.g., Part #1), can occur at a sixth time (e.g., $t_{12}$).

FIG. 7 is a diagram illustrating an example of the first access control memory 114 according to the disclosed technologies. The first access control memory 114 can be associated with the first topic (e.g., sales leads for potential buyers of Part #1). For illustrative purposes, the first access control memory 114 can include information that identifies one or more individuals having subscriptions to receive notifications of events related to Part #1 (e.g., an individual pursuing sales leads associated with manufacturers of Product A (e.g., Anne Alpha)). FIG. 8 is a diagram illustrating an example of the second access control memory 116 according to the disclosed technologies. The second access control memory 116 can be associated with the second topic (e.g., sales leads for potential buyers of Part #2). For illustrative purposes, the second access control memory 116 can include information that identifies one or more individuals having subscriptions to receive notifications of events related to Part #2 (e.g., an individual pursuing sales leads associated with manufacturers of Product B (e.g., Brian Bravo) and an individual pursuing sales leads associated with manufacturers of Product C (e.g., Cindy Charles)). FIG. 9 is a diagram illustrating an example of the third access control memory 118 according to the disclosed technologies. The third access control memory 118 can be associated with the third topic (e.g., sales leads for potential buyers of Part #3). For illustrative purposes, the third access control memory 118 can include information that identifies one or more individuals having subscriptions to receive notifications of events related to Part #3 (e.g., an individual pursuing sales leads associated with manufacturers of Product C (e.g., Cindy Charles)).

Alternatively, FIG. 10 is a diagram illustrating an example of a configuration of the access control memory 136 according to the disclosed technologies. For illustrative purposes, the access control memory 136 can include information that identifies one or more individuals having subscriptions to receive notifications of events related to the first topic (e.g., Part #1 (e.g., an individual pursuing sales leads associated with manufacturers of Product A (e.g., Anne Alpha))); information that identifies one or more individuals having subscriptions to receive notifications of events related to the second topic (e.g., Part #2 (e.g., an individual pursuing sales leads associated with manufacturers of Product B (e.g., Brian Bravo) and an individual pursuing sales leads associated with manufacturers of Product C (e.g., Cindy Charles))); and information that identifies one or more individuals having subscriptions to receive notifications of events related to the third topic (e.g., Part #3 (e.g., an individual pursuing sales leads associated with manufacturers of Product C (e.g., Cindy Charles))).

Figure 11:
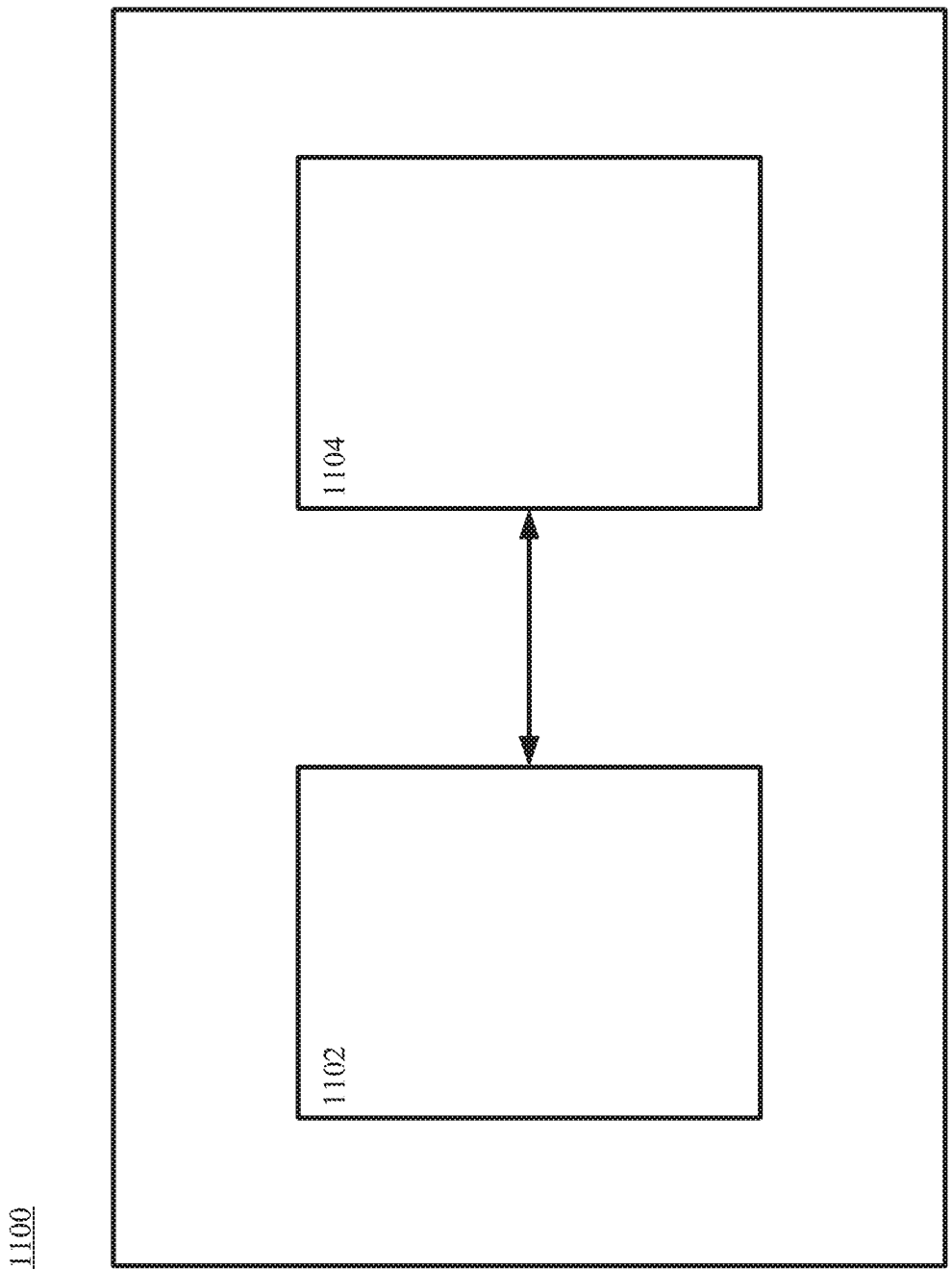
FIG. 11 is a diagram illustrating an example of a user device according to the disclosed technologies.

FIG. 11 is a diagram illustrating an example of a user device 1100 according to the disclosed technologies. For example, the user device 1100 can be the first user device 120, the second user device 122, or the third user device 124. The user device 1100 can include a user device processor 1102 and a user device memory 1104. For example, the user device 1100 can be any suitable electronic device such as a desktop computer, a laptop computer, a tablet computer, a web portal, an enterprise portal, an intranet portal, a captive portal, a smartphone, a personal digital assistant, or the like. Typically, a capacity of the user device memory 1104 (e.g., as may be determined by an application associated with the method for communicating items of information described herein) can be substantially less than a capacity of the first information memory 108, the second information memory 110, or the third information memory 112 (or the information memory 134).

Conventionally, an eventing system can be configured to communicate, in a push mode, a notification of an event (e.g., an item of information about a topic (e.g., a sales lead for a potential buyer of a particular part)) to a user device associated with an individual having a subscription to receive the notification of the event. For illustrative purposes and with reference to FIGS. 1-3, 6, 7, 10, and 11, a first item of information associated with a topic (e.g., a first sales lead for a potential buyer of Part #1 (e.g., Dave Delta)) can be entered into the first information memory 108 (or the information memory 134) at a first time (e.g., $t_1$). The first processor 102 (or the processor 132) can perform, without a request from a user device and in response to an entry of the first item of information into the first information memory 108 (or the information memory 134), a first operation and a second operation to process the first item of information. In the first operation, the first processor 102 (or the processor 132) can cause a retrieval, from the first access control memory 114 (or the access control memory 136), of information that identifies one or more individuals having subscriptions to receive items of information about the topic (e.g., an individual pursuing sales leads associated with manufacturers of Product A (e.g., Anne Alpha)). In the second operation, after the retrieval, the first processor 102 (or the processor 132) can cause a communication of the first item of information to the first user device 120, which can be associated with an individual having a subscription to receive the items of information about the topic (e.g., Anne Alpha). For example, Anne Alpha could have, on the first user device 120, logged into an application configured to interact with the eventing system.

The first user device 120 can receive the first item of information and can store it. For example, the user device 1100 can store the first item of information (e.g., the first sales lead for the potential buyer of Part #1 (e.g., Dave Delta)) in the user device memory 1104 where this information can be available to Anne Alpha in her effort to pursue sales leads for potential buyers of Part #1.

At a later time, a second item of information associated with the topic (e.g., a second sales lead for a potential buyer of Part #1 (e.g., Ellie Echo) can be entered into the first information memory 108 (or the information memory 134) at a second time (e.g., $t_2$). Again, the first processor 102 (or the processor 132) can perform, without a request from a user device and in response to an entry of the second item of information into the first information memory 108 (or the information memory 134), the first operation and the second operation to process the second item of information. In the first operation, the first processor 102 (or the processor 132) can cause a retrieval, from the first access control memory 114 (or the access control memory 136), of information that identifies one or more individuals having subscriptions to receive items of information about the topic (e.g., an individual pursuing sales leads associated with manufacturers of Product A (e.g., Anne Alpha)). In the second operation, after the retrieval, the first processor 102 (or the processor 132) can cause a communication of the second item of information to the first user device 120, which can be associated with an individual having a subscription to receive the items of information about the topic (e.g., Anne Alpha).

However, if the first user device 120 does not have sufficient capacity in the memory (e.g., the user device memory 1104) to store the second item of information, then the processor (e.g., the user device processor 1102) can: (1) reject the second item of information (e.g., the second sales lead for the potential buyer of Part #1 (e.g., Ellie Echo)) and (2) cause a communication, to the eventing system, of a message that indicates a rejection of the second item of information. For example, an application associated with a method for communicating items of information in a conventional eventing system operating in a push mode may determine a capacity of the memory (e.g., the user device memory 1104) to be used for the application. For example, because Anne Alpha may not have completed her effort to pursue the first sales lead for the potential buyer of Part #1 (e.g., Dave Delta), the application may maintain this first item of information in the memory (e.g., the user device memory 1104) such that this memory may not have sufficient capacity to store the second item of information (e.g., the second sales lead for the potential buyer of Part #1 (e.g., Ellie Echo)).

Unfortunately, at a still later time, time consumed by the first processor 102 (or the processor 132) to process the message that indicates the rejection of the second item of information can interfere with an ability of the first processor 102 (or the processor 132) to perform, in response to an entry of a third item of information about the topic (e.g., a third sales lead for a potential buyer of Part #1 (e.g., Gina Golf)) into the first information memory 108 (or the information memory 134) at a third time (e.g., $t_6$), the first operation and the second operation to process the third item of information. For example, such interference can result in a delay of time before the first processor 102 (or the processor 132) can perform the first operation and the second operation to process the third item of information.

Alternatively and conventionally, an eventing system can be configured to communicate, in a pull mode, a notification of an event (e.g., an item of information about a topic (e.g., a sales lead for a potential buyer of a particular part)) to a user device associated with an individual having a subscription to receive the notification of the event. For illustrative purposes and with reference to FIGS. 1-3, 6, 7, 10, and 11, the first processor 102 (or the processor 132) can perform, in response to a receipt, at a first time (e.g., $t_1$), of a first request, from the first user device 120, for one or more items of information about a topic, a set of operations to process the first request. In a first operation, the first processor 102 (or the processor 132) can cause a retrieval, from the first access control memory 114 (or the access control memory 136), of information that identifies one or more individuals having subscriptions to receive the items of information about the topic (e.g., an individual pursuing sales leads associated with manufacturers of Product A (e.g., Anne Alpha)). In a second operation, after the retrieval, the first processor 102 (or the processor 132) can process a determination that the individual associated with the first user device 120 (e.g., Anne Alpha) is among the one or more individuals having the subscriptions to receive the items of information about the topic (e.g., the individual pursuing the sales leads associated with manufacturers of Product A (e.g., Anne Alpha)). In a third operation, after the determination, the first processor 102 (or the processor 132) can cause a communication of a first item of information associated with the topic (e.g., a first sales lead for a potential buyer of Part #1 (e.g., Dave Delta)), which was entered into the first information memory 108 (or the information memory 134) at the first time ($t_1$), to the first user device 120.

The first user device 120 can receive the first item of information and can store it. For example, the user device 1100 can store the first item of information (e.g., the first sales lead for the potential buyer of Part #1 (e.g., Dave Delta)) in the user device memory 1104 where this information can be available to Anne Alpha in her effort to pursue sales leads for potential buyers of Part #1.

At a later time, the first processor 102 (or the processor 132) again can perform, in response to a receipt, at a second time (e.g., $t_2$), of a second request, from the first user device 120, for one or more items of information about the topic, a set of operations to process the second request. In the first operation, the first processor 102 (or the processor 132) can cause a retrieval, from the first access control memory 114 (or the access control memory 136), of information that identifies one or more individuals having subscriptions to receive the items of information about the topic (e.g., an individual pursuing sales leads associated with manufacturers of Product A (e.g., Anne Alpha)). In the second operation, after the retrieval, the first processor 102 (or the processor 132) can process a determination that the individual associated with the first user device 120 (e.g., Anne Alpha) is among the one or more individuals having the subscriptions to receive the items of information about the topic (e.g., the individual pursuing the sales leads associated with manufacturers of Product A (e.g., Anne Alpha)). However, because no new item of information associated with the topic (e.g., a new sales lead for a potential buyer of Part #1) was entered into the first information memory 108 (or the information memory 134) at the second time ($t_2$), the first processor 102 (or the processor 132) cannot cause a communication of an item of information associated with the topic (e.g., a sales lead for a potential buyer of Part #1) to the first user device 120. Moreover, time consumed by the first processor 102 (or the processor 132) to process the second request can interfere with an ability of the first processor 102 (or the processor 132) to perform, in response to a receipt, at a third time (e.g., $t_3$), of a third request, from the first user device 120, for one or more items of information about the topic, a set of operations to process the third request to cause a communication of a second item of information associated with the topic (e.g., a second sales lead for a potential buyer of Part #1 (e.g., Ellie Echo)), which was entered into the first information memory 108 (or the information memory 134) at the third time ($t_3$), to the first user device 120.

FIGS. 12A and 12B are a flow diagram illustrating an example of a method 1200 for communicating items of information according to the disclosed technologies. In the method 1200, at an operation 1202, a first item of information associated with a topic can be entered into an information memory. For example, with reference to FIGS. 1 and 6, a first item of information associated with a topic (e.g., a first sales lead for a potential buyer of Part #1 (e.g., Dave Delta)) can be entered into the information memory 134.

Returning to FIG. 12A, in the method 1200, at an optional operation 1204, a processor of an eventing system can cause a retrieval, from an access control memory, of an information that identifies an entity having a subscription to receive items of information about the topic. For example, with reference to FIGS. 1 and 10, the processor 132 of the eventing system 138 can cause a retrieval, from the access control memory 136, of an information that identifies an entity having a subscription to receive items about the topic (e.g., an individual pursuing sales leads associated with manufacturers of Product A (e.g., Anne Alpha)).

In a configuration, the access control memory 136 can be combined with the information memory 134.

Returning to FIG. 12A, in the method 1200, at an operation 1206, the processor can cause a first communication, to a user device, of the first item of information. The first communication can be based at least in part on the eventing system being, with respect to the user device and the topic, in a first mode. The first mode can be a configuration to cause the eventing system to cause, without a request from a user device, a communication of an item of information to the user device in response to an entry of the item of information into the information memory. The user device can be associated with an entity having a subscription to receive items of information associated with the topic. For example, with reference to FIGS. 1 and 6, the processor 132 can cause a first communication, to the first user device 120, of the first item of information (e.g., the first sales lead for the potential buyer of Part #1 (e.g., Dave Delta)).

Returning to FIG. 12A, in the method 1200, at an operation 1208, the processor can cause, after causing the first communication, the eventing system to be, with respect to the user device and the topic, in a second mode. The second mode can be a configuration to cause the eventing system to refrain from causing a communication of an item of information to a user device. For example, with reference to FIG. 1, the processor 132 can cause, after causing the first communication, the eventing system 138 to be, with respect to the first user device 120 and the topic, in a second mode.

Returning to FIG. 12A, in the method 1200, at an optional operation 1210, a second item of information associated with the topic can be entered, after the eventing system has been caused to be, with respect to the user device and the topic, in the second mode, into the information memory. For example, with reference to FIGS. 1 and 6, a second item of information associated with the topic (e.g., a second sales lead for a potential buyer of Part #1 (e.g., Ellie Echo)) can be entered, after the eventing system 138 has been caused to be, with respect to the first user device 120 and the topic, in the second mode, into the information memory 134.

Returning to FIG. 12A, the second item of information can be a plural number of second items of information. For example, at the optional operation 1210, a plural number of second items of information associated with the topic, can be entered, after the eventing system has been caused to be, with respect to the user device and the topic, in the second mode, into the information memory. For example, with reference to FIGS. 1 and 6, a plural number of second items of information associated with the topic (e.g., a second sales lead for a potential buyer of Part #1 (e.g., Ellie Echo) and a third sales lead for a potential buyer of Part #1 (e.g., Gina Golf)) can be entered, after the eventing system 138 has been caused to be, with respect to the first user device 120 and the topic, in the second mode, into the information memory 134.

Returning to FIG. 12A, in the method 1200, at an operation 1212, the processor can receive, from the user device, a first signal to cause the eventing system to switch, with respect to the user device and the topic, from the second mode to the first mode. For example, with reference to FIG. 1, the processor 132 can receive, from the first user device 120, a first signal to cause the eventing system 138 to switch, with respect to the first user device 120 and the topic, from the second mode to the first mode.

Returning to FIG. 12A, in the method 1200, at an optional operation 1214, the processor can obtain a measure of network bandwidth capacity between the processor and the user device. For example, with reference to FIG. 1, the processor 132 can determine the measure of network bandwidth capacity between the processor 132 and the first user device 120. Alternatively or additionally, the processor 132 can receive, from an outside source (not illustrated), the measure of network bandwidth capacity between the processor 132 and the first user device 120.

Returning to FIG. 12A, in the method 1200, at an optional operation 1216, the processor can determine, based on the measure of the network bandwidth capacity, a number of the items of information communicable to the user device within a duration of time. For example, with reference to FIG. 1, the processor 132 can determine, based on the measure of the network bandwidth capacity, a number of the items of information (e.g., 1) communicable to the first user device 120 within a duration of time Returning to FIG. 12A, in the method 1200, at an optional operation 1218, the processor can cause a second communication, to the user device, of the second item of information. The second communication can be based at least in part on the eventing system being, with respect to the user device and the topic, in the first mode. For example, with reference to FIGS. 1 and 6, the processor 132 can cause a second communication, to the first user device 120, of the second item of information (e.g., the second sales lead for the potential buyer of Part #1 (e.g., Ellie Echo)).

Returning to FIG. 12A, the second item of information can be a plural number of second items of information. For example, at the optional operation 1210, a plural number of second items of information associated with the topic, can be entered, after the eventing system has been caused to be, with respect to the user device and the topic, in the second mode, into the information memory. For example, with reference to FIGS. 1 and 6, a plural number of second items of information associated with the topic (e.g., a second sales lead for a potential buyer of Part #1( e.g., Ellie Echo) and a third sales lead for a potential buyer of Part #1 (e.g., Gina Golf)) can be entered, after the eventing system 138 has been caused to be, with respect to the first user device 120 and the topic, in the second mode, into the information memory 134.

Returning to FIG. 12A, in a variation of the operation 1218, the second communication can be a communication of a lesser of the plural number of the second items of information and the number of the second items of information communicable to the first user device within the duration of time. For example, with reference to FIGS. 1 and 6, the second communication can be a communication of a lesser of the plural number of the second items of information (e.g., 2) and the number of the second items of information communicable to the first user device 120 within the duration of time (e.g., 1). That is, in this example the processor 132 can cause a communication of one of the second items of information (e.g., Ellie Echo or Gina Golf).

Returning to FIG. 12A, in a variation of the operations 1212 and 1218, the first signal can include a value. The value can be a requested number of the second items of information. The second communication can be a communication of a lesser of the plural number of the second items of information and the requested number of the second items of information. For example, with reference to FIGS. 1 and 6, the first signal can include a value (e.g., 1). The value can be a requested number of the second items of information. The second communication can be a communication of a lesser of the plural number of the second items of information (e.g., 2) and the requested number of the second items of information (e.g., 1). That is, in this example the processor 132 can cause a communication of one of the second items of information (e.g., Ellie Echo or Gina Golf).

Returning to FIG. 12A, in a variation of the operations 1212 and 1218, the first signal can include a value. The value can be information about an available memory capacity, of a user device memory of the user device, to receive the items of information. For example, the information about the available memory capacity can be that the available memory capacity is sufficient to receive one additional item of information. The second communication can be a communication of a lesser of the plural number of the second items of information and a number of the second items of information that corresponds to the information about the available memory capacity. For example, with reference to FIGS. 1, 6, and 11, the first signal can include a value about information about an available memory capacity, of the user device memory 1104 of the first user device 120, to receive the items of information that corresponds to an available memory capacity to receive one additional item of information. The second communication can be a communication of a lesser of the plural number of the second items of information (e.g., 2) and a number of the second items of information that corresponds to the information about the available memory capacity (e.g., 1). That is, in this example the processor 132 can cause a communication of one of the second items of information (e.g., Ellie Echo or Gina Golf).

Returning to FIG. 12A, in a variation of the operations 1208, 1210, 1212, and 1218, the processor can cause, at a first time, the eventing system to be, with respect to the user device and the topic, in the second mode. A first portion of the plural number of the second items of information can be entered into the information memory between the first time and a second time. A second portion of the plural number of the second items of information can be entered into the information memory between the second time and a third time. The first signal can be received at the third time. The second communication can be a communication of the first portion of the plural number of second items of information. Alternatively, the second communication can be a communication of the second portion of the plural number of second items of information. For example, with reference to FIGS. 1 and 6, the processor 132 can cause, at a first time (e.g., $t_2$), the eventing system 138 to be, with respect to the first user device 120 and the topic, in the second mode. A first portion (e.g., Ellie Echo) of the plural number of the second items of information can be entered into the information memory 134 between the first time ($t_2$) and a second time (e.g., $t_5$). A second portion (e.g., Gina Golf) of the plural number of the second items of information can be entered into the information memory 134 between the second time ($t_5$) and a third time (e.g., $t_7$). The first signal can be received at the third time ($t_7$). The second communication can be a communication of the first portion (e.g., Ellie Echo) of the plural number of the second items of information. Alternatively, the second communication can be a communication of the second portion (e.g., Gina Golf) of the plural number of the second items of information.

Returning to FIG. 12A, at an operation 1220, a third item of information associated with the topic can be entered into the information memory after receiving the first signal. For example, with reference to FIGS. 1 and 6, a fourth item of information associated with the topic (e.g., a fourth sales lead for a potential buyer of Part #1 (e.g., Ilana India)) can be entered into the information memory 134.

Returning to FIG. 12A, at an operation 1222, the processor can cause a third communication, to the user device, of the third item of information. The third communication can be based at least in part on the eventing system being, with respect to the user device and the topic, in the first mode. For example, with reference to FIGS. 1 and 6, the processor 132 can cause a third communication, to the first user device 120, of the fourth item of information (e.g., the fourth sales lead for the potential buyer of Part #1 (e.g., Ilana India)).

In this manner, the individual associated with the first user device 120 (e.g., Anne Alpha) can operate the eventing system 138 in a manner to place the eventing system 132 in a push mode at a time that is convenient for the individual. This can avoid a situation in which the first user device 120 might otherwise reject an item of information and cause a communication, to the eventing system 138, of a message that indicates the rejection of the item of information. This, in turn, can avoid causing the eventing system 138 to need to process the message such that the time consumed to process the message would interfere with (e.g., cause a delay in) an ability of the eventing system 138 to process other items of information. Moreover, allowing the individual associated with the first user device 120 (e.g., Anne Alpha) to control the timing of when the eventing system 138 is placed in a push mode can also avoid the need for the individual associated with the first user device 120 (e.g., Anne Alpha) to communicate repeated requests for items of information, as would be required if the eventing system 138 was operated in a pull mode. This, in turn, can avoid causing the eventing system 138 to need to process the repeated requests such that the time consumed to process the repeated requests would interfere with (e.g., cause a delay in) an ability of the eventing system 138 to process other items of information.

Returning to FIG. 12A, at an optional operation 1224, the processor can receive, from the user device, a second signal to cause the eventing system to be, with respect to the user device and the topic, in the second mode. For example, with reference to FIG. 1, the processor 132 can receive, from the first user device 120, a second signal to cause the eventing system 138 to be, with respect to the first user device 120 and the first topic, in the second mode.

Figure 13B:
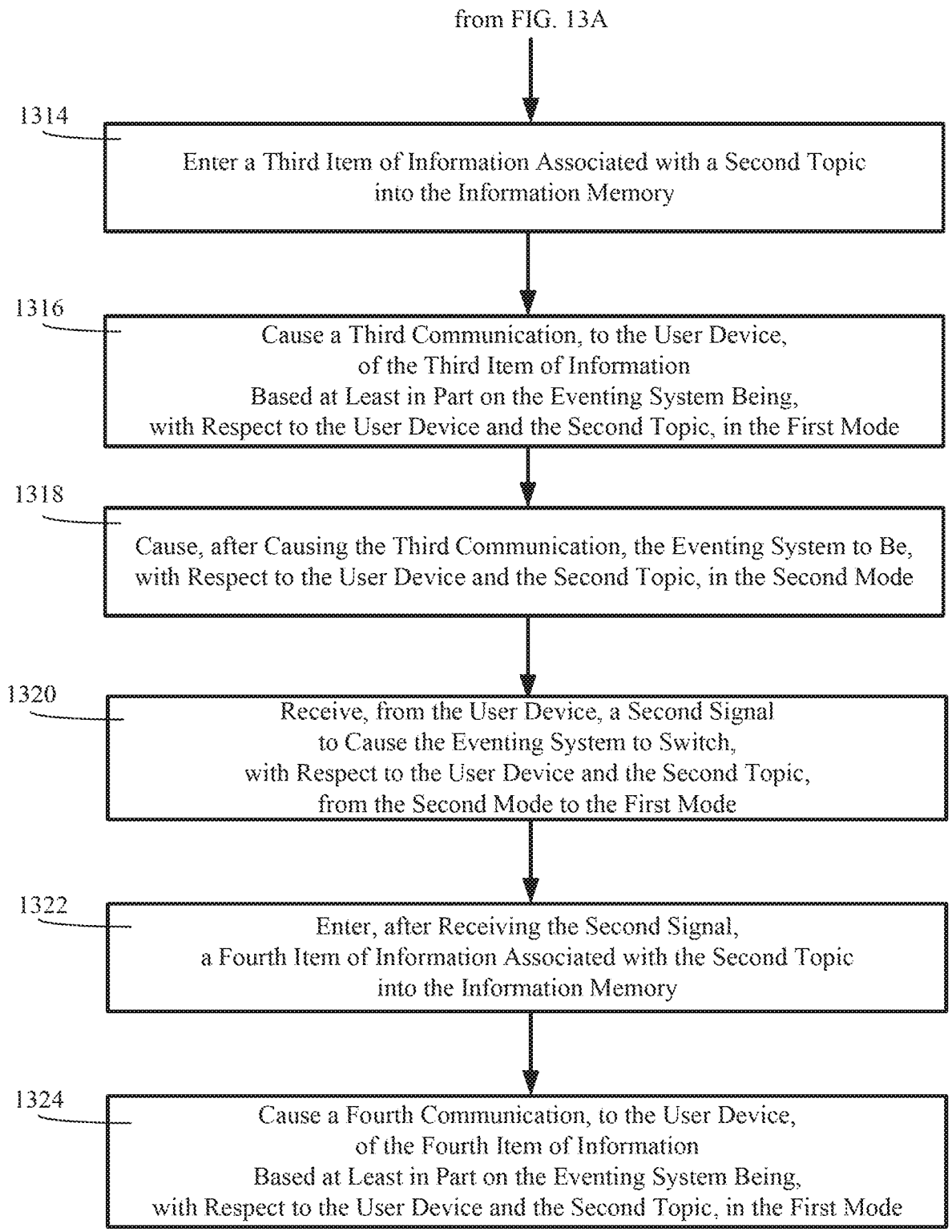

FIGS. 13A and 13B are a flow diagram illustrating an example of a method 1300 for communicating items of information according to the disclosed technologies. The method 1300 is a variation of the method 1200. In the method 1300, at an operation 1302, a first item of information associated with a first topic can be entered into an information memory. For example, with reference to FIGS. 1 and 6, a first item of information associated with a first topic (e.g., a first sales lead for a potential buyer of Part #2 (e.g., Frank Foxtrot)) can be entered into the information memory 134.

Returning to FIG. 13A, in the method 1300, at an operation 1304, the processor can cause a first communication, to a user device, of the first item of information. The first communication can be based at least in part on the eventing system being, with respect to the user device and the first topic, in a first mode. The first mode can be a configuration to cause the eventing system to cause, without a request from a user device, a communication of an item of information to the user device in response to an entry of the item of information into the information memory. The user device can be associated with an entity having a first subscription to receive items of information associated with the first topic. For example, with reference to FIGS. 1 and 6, the processor 132 can cause a first communication, to the third user device 124, of the first item of information (e.g., the first sales lead for the potential buyer of Part #2 (e.g., Frank Foxtrot)).

Returning to FIG. 13A, in the method 1300, at an operation 1306, the processor can cause, after causing the first communication, the eventing system to be, with respect to the user device and the first topic, in a second mode. The second mode can be a configuration to cause the eventing system to refrain from causing a communication of an item of information to a user device. For example, with reference to FIG. 1, the processor 132 can cause, after causing the first communication, the eventing system 138 to be, with respect to the third user device 124 and the first topic, in a second mode.

Returning to FIG. 13A, in the method 1300, at an operation 1308, the processor can receive, from the user device, a first signal to cause the eventing system to switch, with respect to the user device and the first topic, from the second mode to the first mode. For example, with reference to FIG. 1, the processor 132 can receive, from the third user device 124, a first signal to cause the eventing system 138 to switch, with respect to the third user device 124 and the first topic, from the second mode to the first mode.

Returning to FIG. 13A, in the method 1300, at an operation 1310, a second item of information associated with the first topic can be entered into the information memory after receiving the first signal. For example, with reference to FIGS. 1 and 6, a second item of information associated with the first topic (e.g., a second sales lead for a potential buyer of Part #2 (e.g., Henry Hotel)) can be entered into the information memory 134.

Returning to FIG. 13A, in the method 1300, at an operation 1312, the processor can cause a second communication, to the user device, of the second item of information. The second communication can be based at least in part on the eventing system being, with respect to the user device and the first topic, in the first mode. For example, with reference to FIGS. 1 and 6, the processor 132 can cause a second communication, to the third user device 124, of the second item of information (e.g., the second sales lead for the potential buyer of Part #2 (e.g., Henry Hotel)).

With reference to FIG. 13B, in the method 1300, at an operation 1314, a third item of information associated with a second topic can be entered into the information memory. For example, with reference to FIGS. 1 and 6, a third item of information associated with a second topic (e.g., a first sales lead for a potential buyer of Part #3 (e.g., Gina Golf)) can be entered into the information memory 134.

Returning to FIG. 13B, in the method 1300, at an operation 1316, the processor can cause a third communication, to the user device, of the third item of information. The third communication can be based at least in part on the eventing system being, with respect to the user device and the second topic, in the first mode. The entity can have a second subscription to receive items of information associated with the second topic. For example, with reference to FIGS. 1 and 6, the processor 132 can cause a third communication, to the third user device 124, of the third item of information (e.g., the first sales lead for the potential buyer of Part #3 (e.g., Gina Golf)).

Returning to FIG. 13B, in the method 1300, at an operation 1318, the processor can cause, after causing the third communication, the eventing system to be, with respect to the user device and the second topic, in the second mode. For example, with reference to FIG. 1, the processor 132 can cause, after causing the third communication, the eventing system 138 to be, with respect to the third user device 124 and the second topic, in the second mode.

Returning to FIG. 13B, in the method 1300, at an operation 1320, the processor can receive, from the user device, a second signal to cause the eventing system to switch, with respect to the user device and the second topic, from the second mode to the first mode. For example, with reference to FIG. 1, the processor 132 can receive, from the third user device 124, a second signal to cause the eventing system 138 to switch, with respect to the third user device 124 and the second topic, from the second mode to the first mode.

Returning to FIG. 13B, in the method 1300, at an operation 1322, a fourth item of information associated with the second topic can be entered into the information memory after receiving the second signal. For example, with reference to FIGS. 1 and 6, a fourth item of information associated with the second topic (e.g., a second sales lead for a potential buyer of Part #3 (e.g., Henry Hotel)) can be entered into the information memory 134.

Returning to FIG. 13B, in the method 1300, at an operation 1324, the processor can cause a fourth communication, to the user device, of the fourth item of information. The fourth communication can be based at least in part on the eventing system being, with respect to the user device and the second topic, in the first mode. For example, with reference to FIGS. 1 and 6, the processor 132 can cause a fourth communication, to the third user device 124, of the second item of information (e.g., the second sales lead for the potential buyer of Part #3 (e.g., Henry Hotel)).

Returning to FIGS. 13A and 13B, in a variation of the method 1300, the processor can include a first processor and a second processor. The operations 1302, 1304, 1306, 1308, 1310, and 1312 can be performed by the first processor. The operations 1314, 1316, 1318, 1320, 1322, and 1324 can be performed by the second processor. For example, with reference to FIG. 1: (1) the second processor 104 can perform the operations 1302, 1304, 1306, 1308, 1310, and 1312 for the items of information about the first topic and (2) the third processor 106 can perform the operations 1314, 1316, 1318, 1320, 1322, and 1324 for the items of information about the second topic.

Returning to FIGS. 13A and 13B, in another variation of the method 1300, the information memory can include a first information memory and a second information memory. In the operation 1302, the entering, into the information memory, the first item of information can be entering, into the first information memory, the first item of information. In the operation 1310, the entering, into the information memory, the second item of information can be entering, into the first information memory, the second item of information. In the operation 1314, the entering, into the information memory, the third item of information can be entering, into the second information memory, the third item of information. In the operation 1322, the entering, into the information memory, the fourth item of information can be entering, into the second information memory, the fourth item of information. For example, with reference to FIGS. 1, 4, and 5: (1) the entering, into the information memory, the first item of information (e.g., Frank Foxtrot) can be entering, into the second information memory 110, the first item of information (e.g., Frank Foxtrot), (2) the entering, into the information memory, the second item of information (e.g., Henry Hotel) can be entering, into the second information memory 110, the second item of information (e.g., Henry Hotel), (3) the entering, into the information memory, the third item of information (e.g., Gina Golf) can be entering, into the third information memory 112, the third item of information (e.g., Gina Golf), and (4) the entering, into the information memory, the fourth item of information (e.g., Henry Hotel) can be entering, into the third information memory 112, the fourth item of information (e.g., Henry Hotel).

FIGS. 14A and 14B are a flow diagram illustrating an example of a method 1400 for communicating items of information according to the disclosed technologies. The method 1400 is a variation of the method 1200. In the method 1400, at an optional operation 1402, a processor can cause a first retrieval, from an access control memory, of a first information that identifies a first entity having a first subscription to receive items of information about a topic. For example, with reference to FIGS. 1 and 10, the processor 132 can cause a first retrieval, from the access control memory 136, of a first information that identifies a first entity (e.g., Brian Bravo) having a first subscription to receive items of information about a topic (e.g., sales leads for potential buyers of Part #2).

Returning to FIG. 14A, in the method 1400, at an optional operation 1404, the processor can cause a second retrieval, from the access control memory, of a second information that identifies a second entity having a second subscription to receive the items of information about the topic. For example, with reference to FIGS. 1 and 10, the processor 132 can cause a second retrieval, from the access control memory 136, of a second information that identifies a second entity (e.g., Cindy Charles) having a second subscription to receive the items of information about the topic (e.g., the sales leads for the potential buyers of Part #2).

Returning to FIG. 14A, in the method 1400, at an operation 1406, a first item of information associated with the topic can be entered into an information memory. For example, with reference to FIGS. 1 and 6, a first item of information associated with the topic (e.g., a first sales lead for a potential buyer of Part #2 (e.g., Frank Foxtrot)) can be entered into the information memory 134.

Returning to FIG. 14A, in the method 1400, at an operation 1408, the processor can cause a first communication, to a first user device, of the first item of information. The first communication can be based at least in part on the eventing system being, with respect to the first user device and the topic, in a first mode. The first mode can be a configuration to cause the eventing system to cause, without a request from a user device, a communication of an item of information to the user device in response to an entry of the item of information into the information memory. The first user device can be associated with the first entity having the first subscription to receive items of information associated with the topic. For example, with reference to FIGS. 1 and 6, the processor 132 can cause a first communication, to the second user device 122, of the first item of information (e.g., the first sales lead for the potential buyer of Part #2 (e.g., Frank Foxtrot)).

Returning to FIG. 14A, in the method 1400, at an operation 1410, the processor can cause a second communication, to a second user device, of the first item of information. The second communication can be based at least in part on the eventing system being, with respect to the second user device and the topic, in the first mode. The second user device can be associated with the second entity having the second subscription to receive the items of information associated with the topic. For example, with reference to FIGS. 1 and 6, the processor 132 can cause a second communication, to the third user device 124, of the first item of information (e.g., the first sales lead for the potential buyer of Part #2 (e.g., Frank Foxtrot)).

Returning to FIG. 14A, in the method 1400, at an operation 1412, the processor can cause, after causing the first communication, the eventing system to be, with respect to the first user device and the topic, in a second mode. The second mode can be a configuration to cause the eventing system to refrain from causing a communication of an item of information to a user device. For example, with reference to FIG. 1, the processor 132 can cause, after causing the first communication, the eventing system 138 to be, with respect to the second user device 122 and the topic, in a second mode.

With reference to FIG. 14B, in the method 1400, at an operation 1414, the processor can receive, from the first user device, a signal to cause the eventing system to switch, with respect to the first user device and the topic, from the second mode to the first mode. For example, with reference to FIG. 1, the processor 132 can receive, from the second user device 122, a signal to cause the eventing system 138 to switch, with respect to the second user device 122 and the topic, from the second mode to the first mode.

Returning to FIG. 14B, in the method 1400, at an operation 1416, a second item of information associated with the topic can be entered into the information memory after receiving the signal. For example, with reference to FIGS. 1 and 6, a second item of information associated with the topic (e.g., a second sales lead for a potential buyer of Part #2 (e.g., Henry Hotel)) can be entered into the information memory 134.

Returning to FIG. 14B, in the method 1400, at an operation 1418, the processor can cause a third communication, to the first user device, of the second item of information. The third communication can be based at least in part on the eventing system being, with respect to the first user device and the topic, in the first mode. For example, with reference to FIGS. 1 and 6, the processor 132 can cause a third communication, to the second user device 122, of the second item of information (e.g., the second sales lead for the potential buyer of Part #2 (e.g., Henry Hotel)).

Figure 15A:
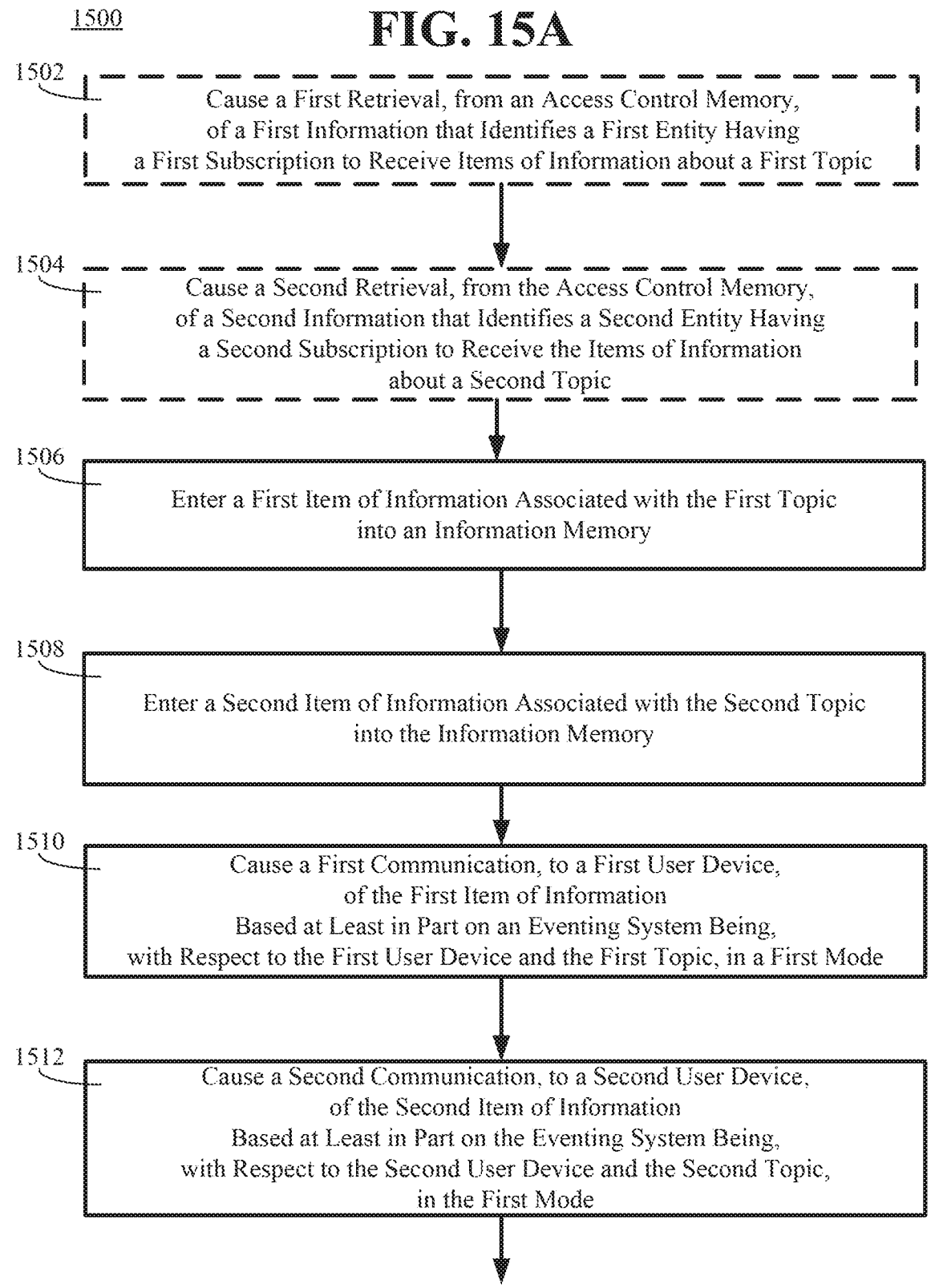

FIGS. 15A and 15B are a flow diagram illustrating an example of a method 1500 for communicating items of information according to the disclosed technologies. The method 1500 is a variation of the method 1200. In the method 1500, at an optional operation 1502, a processor can cause a first retrieval, from an access control memory, of a first information that identifies a first entity having a first subscription to receive items of information about a first topic. For example, with reference to FIGS. 1 and 10, the processor 132 can cause a first retrieval, from the access control memory 136, of a first information that identifies a first entity (e.g., Anne Alpha) having a first subscription to receive items of information about a first topic (e.g., sales leads for potential buyers of Part #1).

Returning to FIG. 15A, in the method 1500, at an optional operation 1504, the processor can cause a second retrieval, from the access control memory, of a second information that identifies a second entity having a second subscription to receive the items of information about a second topic. For example, with reference to FIGS. 1 and 10, the processor 132 can cause a second retrieval, from the access control memory 136, of a second information that identifies a second entity (e.g., Brian Bravo) having a second subscription to receive the items of information about a second topic (e.g., sales leads for potential buyers of Part #2).

Returning to FIG. 15A, in the method 1500, at an operation 1506, a first item of information associated with the first topic can be entered into an information memory. For example, with reference to FIGS. 1 and 6, a first item of information associated with the first topic (e.g., a first sales lead for a potential buyer of Part #1 (e.g., Dave Delta)) can be entered into the information memory 134.

Returning to FIG. 15A, in the method 1500, at an operation 1508, a second item of information associated with the second topic can be entered into the information memory. For example, with reference to FIGS. 1 and 6, a second item of information associated with the second topic (e.g., a first sales lead for a potential buyer of Part #2 (e.g., Frank Foxtrot)) can be entered into the information memory 134.

Returning to FIG. 15A, in the method 1500, at an operation 1510, the processor can cause a first communication, to a first user device, of the first item of information. The first communication can be based at least in part on the eventing system being, with respect to the first user device and the first topic, in a first mode. The first mode can be a configuration to cause the eventing system to cause, without a request from a user device, a communication of an item of information to the user device in response to an entry of the item of information into the information memory. The first user device can be associated with the first entity having the first subscription to receive items of information associated with the first topic. For example, with reference to FIGS. 1 and 6, the processor 132 can cause a first communication, to the first user device 120, of the first item of information (e.g., the first sales lead for the potential buyer of Part #1 (e.g., Dave Delta)).

Returning to FIG. 15A, in the method 1500, at an operation 1512, the processor can cause a second communication, to a second user device, of the second item of information. The second communication can be based at least in part on the eventing system being, with respect to the second user device and the second topic, in the first mode. The second user device can be associated with the second entity having the second subscription to receive items of information associated with the second topic. For example, with reference to FIGS. 1 and 6, the processor 132 can cause a second communication, to the second user device 122, of the second item of information (e.g., the first sales lead for the potential buyer of Part #2 (e.g., Frank Foxtrot)).

With reference to FIG. 15B, in the method 1500, at an operation 1514, the processor can cause, after causing the first communication, the eventing system to be, with respect to the first user device and the first topic, in a second mode. The second mode can be a configuration to cause the eventing system to refrain from causing a communication of an item of information to a user device. For example, with reference to FIG. 1, the processor 132 can cause, after causing the first communication, the eventing system 138 to be, with respect to the first user device 120 and the topic, in a second mode.

Returning to FIG. 15B, in the method 1500, at an operation 1516, the processor can receive, from the first user device, a signal to cause the eventing system to switch, with respect to the first user device and the first topic, from the second mode to the first mode. For example, with reference to FIG. 1, the processor 132 can receive, from the first user device 120, a signal to cause the eventing system 138 to switch, with respect to the first user device 120 and the first topic, from the second mode to the first mode.

Returning to FIG. 15B, in the method 1500, at an operation 1518, a third item of information associated with the first topic can be entered into the information memory after receiving the signal. For example, with reference to FIGS. 1 and 6, a third item of information associated with the first topic (e.g., a second sales lead for a potential buyer of Part #1 (e.g., Ellie Echo)) can be entered into the information memory 134.

Returning to FIG. 15B, in the method 1500, at an operation 1520, the processor can cause a third communication, to the first user device, of the third item of information. The third communication can be based at least in part on the eventing system being, with respect to the first user device and the first topic, in the first mode. For example, with reference to FIGS. 1 and 6, the processor 132 can cause a third communication, to the third user device 120, of the third item of information (e.g., the second sales lead for the potential buyer of Part #1 (e.g., Ellie Echo)).

With reference to FIG. 15A, in a variation of the method 1500, the access control memory can include a first access control memory and a second access control memory. In the operation 1502, the first retrieval, from the access control memory, of the first information can be a first retrieval, from the first access control memory, of the first information. In the operation 1504, the second retrieval, from the access control memory, of the second information can be a second retrieval, from the second access control memory, of the second information. For example, with reference to FIGS. 1, 7, and 8: (1) the first retrieval, from the access control memory, of the first information (e.g., Anne Alpha) can be a first retrieval, from the first access control memory 114, of the first information (e.g., Anne Alpha) and (2) the second retrieval, from the access control memory, of the second information (e.g., Brian Bravo) can be a second retrieval, from the second access control memory 116, of the second information (e.g., Brian Bravo).

Various implementations for communicating items of information can include or be implemented in the form of computer-implemented processes and apparatuses for practicing those processes. Implementations also can be implemented in the form of a computer program product having computer program code containing instructions implemented in non-transitory and/or tangible media, such as floppy diskettes, compact disc read-only memories (CD-ROMs), hard drives, universal serial bus (USB) drives, or any other machine readable storage medium, wherein, when the computer program code is loaded into and executed by a computer, the computer becomes an apparatus for practicing implementations for communicating the items of information.

Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations for communicating items of information. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions.

Implementations can be implemented using hardware that can include a processor, such as a general-purpose microprocessor and/or an application-specific integrated circuit (ASIC) that implements all or part of the techniques according to implementations of the disclosed subject matter in hardware and/or firmware. The processor can be coupled to memory, such as random-access memory (RAM), read-only memory (ROM), flash memory, a hard disk or any other device capable of storing electronic information. The memory can store instructions adapted to be executed by the processor to perform the techniques for communicating items of information.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, thereby to enable others skilled in the art to utilize those implementations as well as various implementations with various modifications as may be suited to the particular use contemplated.

The invention claimed is:

1. A method for communicating items of information, the method comprising:
   entering, into an information memory, a first item of information associated with a first topic;
   causing, by a processor of an eventing system, a first communication, to a first user device, of the first item of information, the first communication being based at least in part on the eventing system being, with respect to the first user device and the first topic, in a first mode, the first mode being a configuration to cause the eventing system to cause, without a request from a user device, a communication of an item of information to an entry of the item of information into the information memory, the first user device being associated with a first entity having a first subscription to receive items of information associated with the first topic;
   after the causing the first communication, determining, by a processor of the first user device, an item of information associated with the first topic received at the first user device is not stored at the first user device, and communicating, form the first user device to the eventing system, a message indicating the item of information not being stored at the first user device;
   causing the eventing system to be, with respect to the first user device and the first topic, in a second mode based on receiving the message indicating the item of information not being stored at the first user device, the second mode being a configuration to stop the eventing system from communicating any subsequent items of information to the first user device;
   receiving, by the processor and from the first user device, a first signal to cause the eventing system to switch, with respect to the first user device and the first topic, from the second mode to the first mode, the first mode to cause the eventing system to communicate, without any further request from the user device, a subsequent item of information to the user device in response to an entry of the subsequent item of information into the information memory;
   after the receiving the first signal, entering, into the information memory, a second item of information associated with the first topic; and
   causing, by the processor, a second communication, to the first user device, of the second item of information, the second communication being based at least in part on the eventing system being, with respect to the first user device and the first topic, in the first mode.

2. The method of claim 1, further comprising receiving, by the processor and from the first user device, a second signal to cause the eventing system to be, with respect to the first user device and the first topic, in the second mode.

3. The method of claim 1, further comprising causing, by the processor and before the first communication, a retrieval, from an access control memory, of a first information that identifies the first entity having the first subscription to receive the items of information about the first topic.

4. The method of claim 3, wherein the access control memory is combined with the information memory.

5. The method of claim 1, further comprising:
   after the causing the eventing system to be, with respect to the first user device and the first topic, in the second mode and before the receiving the first signal, entering, into the information memory, a third item of information associated with the first topic; and
   causing, by the processor, a third communication, to the first user device, of the third item of information, the third communication being based at least in part on the eventing system being, with respect to the first user device and the first topic, in the first mode.

6. The method of claim 5, wherein the third item of information comprises a plural number of third items of information.

7. The method of claim 6, wherein:
   the first signal includes a value, the value being a requested number of the third items of information; and
   the third communication comprises a communication of a lesser of the plural number of the third items of information and the requested number of the third items of information.

8. The method of claim 6, wherein:
   the first signal includes a value, the value being information about an available memory capacity, of a user device memory of the first user device, to receive the items of information; and
   the third communication comprises a communication of a lesser of the plural number of the third items of information and a number of the third items of information that corresponds to the information about the available memory capacity.

9. The method of claim 6, wherein:
   the causing the eventing system to be, with respect to the first user device and the first topic, in the second mode comprises causing, at a first time, the eventing system to be, with respect to the first user device and the first topic, in the second mode;
   the entering the third item of information comprises:
      entering, between the first time and a second time, a first portion of the plural number of the third items of information; and
      entering, between the second time and a third time, a second portion of the plural number of the third items of information;
   the receiving the first signal comprises receiving, at the third time, the first signal; and
   the third communication comprises a communication of the first portion of the plural number of the third items of information.

10. The method of claim 6, wherein:
    the causing the eventing system to be, with respect to the first user device and the first topic, in the second mode comprises causing, at a first time, the eventing system to be, with respect to the first user device and the first topic, in the second mode;
    the entering the third item of information comprises:
    entering, between the first time and a second time, a first portion of the plural number of the third items of information; and
    entering, between the second time and a third time, a second portion of the plural number of the third items of information;
    the receiving the first signal comprises receiving, at the third time, the first signal; and
    the third communication comprises a communication of the second portion of the plural number of the third items of information.

11. The method of claim 6, further comprising:
    obtaining, by the processor, a measure of network bandwidth capacity between the processor and the first user device; and determining, by the processor and based on the measure of the network bandwidth capacity, a number of the third items of information communicable to the first user device within a duration of time; and wherein the third communication comprises a communication of a lesser of the plural number of the third items of information and the number of the third items of information communicable to the first user device within the duration of time.

12. The method of claim 1, further comprising:
entering, into the information memory, a third item of information associated with a second topic;
causing, by the processor, a third communication of the third item of information to the first user device, the third communication being based at least in part on the eventing system being, with respect to the first user device and the second topic, in the first mode, the first entity having a second subscription to receive items of information associated with the second topic;
after the causing the third communication, causing, by the processor, the eventing system to be, with respect to the first user device and the second topic, in the second mode;
receiving, by the processor and from the first user device, a second signal to cause the eventing system to switch, with respect to the first user device and the second topic, from the second mode to the first mode;
after the receiving the second signal, entering, into the information memory, a fourth item of information associated with the second topic; and
causing, by the processor, a fourth communication of the fourth item of information to the first user device, the fourth communication being based at least in part on the eventing system being, with respect to the first user device and the second topic, in the first mode.

13. The method of claim 12, wherein:
the processor comprises a first processor and a second processor;
the causing the first communication, the causing the eventing system to be, with respect to the first user device and the first topic, in the second mode, the receiving the first signal, and the causing the second communication are performed by the first processor; and
the causing the third communication, the causing the eventing system to be, with respect to the first user device and the second topic, in the second mode, the receiving the second signal, and the causing the fourth communication are performed by the second processor.

14. The method of claim 12, wherein:
the information memory comprises a first information memory and a second information memory;
the entering, into the information memory, the first item of information comprises entering, into the first information memory, the first item of information;
the entering, into the information memory, the second item of information comprises entering, into the first information memory, the second item of information;
the entering, into the information memory, the third item of information comprises entering, into the second information memory, the third item of information; and
the entering, into the information memory, the fourth item of information comprises entering, into the second information memory, the fourth item of information.

15. The method of claim 1, further comprising causing, by the processor, a third communication of the first item of information about the first topic to a second user device, the third communication being based at least in part on the eventing system being, with respect to the second user device and the first topic, in the first mode, the second user device being associated with a second entity having a second subscription to receive the items of information about the first topic.

16. The method of claim 15, further comprising causing, by the processor and before the first communication and the third communication:
a first retrieval, from an access control memory, of a first information that identifies the first entity having the first subscription to receive the items of information about the first topic; and
a second retrieval, from the access control memory, of a second information that identifies the second entity having the second subscription to receive the items of information about the first topic.

17. The method of claim 1, further comprising:
entering, into the information memory, a third item of information associated with a second topic;
causing, by the processor, a third communication of the third item of information to a second user device, the third communication being based at least in part on the eventing system being, with respect to the second user device and the second topic, in the first mode, the second user device being associated with a second entity having a second subscription to receive the items of information about the second topic.

18. The method of claim 17, further comprising causing, by the processor and before the first communication and the third communication:
a first retrieval, from an access control memory, of a first information that identifies the first entity having the first subscription to receive the items of information about the first topic; and
a second retrieval, from the access control memory, of a second information that identifies the second entity having the second subscription to receive the items of information about the second topic.

19. The method of claim 18, wherein:
the access control memory comprises a first access control memory and a second access control memory;
the first retrieval, from the access control memory, of the first information comprises a first retrieval, from the first access control memory, of the first information; and
the second retrieval, from the access control memory, of the second information comprises a second retrieval, from the second access control memory, of the second information.

20. The method of claim 1, wherein determining the item of information associated with the first topic received at the first user device is not stored further includes, determining a capacity of memory at the first user device being insufficient to store the item of information associated with the first topic, and communicating, from the first user device to the eventing system based on the determined insufficient capacity of memory, the message further indicating a rejection of the item of information received at the user device.

21. A non-transitory computer-readable medium storing computer code for controlling a processor to cause the processor to communicate items of information, the computer code including instructions to cause the processor to:
enter, into a memory, a first item of information associated with a topic;
cause a first communication, to a user device, of the first item of information, the first communication being based at least in part on an eventing system being, with respect to the user device and the topic, in a first mode, the first mode being a configuration to cause the eventing system to cause, without a request from the user device, a communication of an item of information to the user device in response to an entry of the item of information into the memory, the user device being associated with an entity having a subscription to receive items of information associated with the topic;

after a causation of the first communication, determining, by a processor of the first user device, an item of information associated with the first topic received at the first user device is not stored at the first user device, and communicating, from the first user device to the eventing system, a message indicating the item of information not being stored at the first user device;

cause the eventing system to be, with respect to the user device and the topic, in a second mode based on receiving the message indicating the item of information not being stored at the first user device, the second mode being a configuration to stop the eventing system from communicating any subsequent item of information to the user device;

receive, from the user device, a signal to cause the eventing system to switch, with respect to the user device and the topic, from the second mode to the first mode, the first mode to cause the eventing system to communicate, without any further request from the user device, a subsequent item of information to the user device in response to an entry of the subsequent item of information into the information memory;

after a receipt of the first signal, enter, into the memory, a second item of information associated with the topic; and cause a second communication, to the user device, of the second item of information, the second communication being based at least in part on the eventing system being, with respect to the user device and the topic, in the first mode.

22. The non-transitory computer-readable medium of claim 21, wherein determining the item of information associated with the first topic received at the first user device is not stored further includes computer code including instructions to cause the processor to determine a capacity of memory at the first user device being insufficient to store the item of information associated with the first topic, and communicate, from the first user device to the eventing system based on the determined insufficient capacity of memory, the message further indicating a rejection of the item of information received at the user device.

23. A system for communicating items of information, the system comprising:

a memory configured to store items of information associated with a topic; and a processor configured to:

enter, into a memory, a first item of information associated with the topic;

cause a first communication, to a user device, of the first item of information, the first communication being based at least in part on an eventing system being, with respect to the user device and the topic, in a first mode, the first mode being a configuration to cause the eventing system to cause, without a request from the user device, a communication of an item of information to the user device in response to an entry of the item of information into the memory, the user device being associated with an entity having a subscription to receive items of information associated with the topic;

after a causation of the first communication, determining, by a processor of the first user device, an item of information associated with the first topic received at the first user device is not stored at the first user device, and communicating, from the first user device to the eventing system, a message indicating the item of information not being stored:

cause the eventing system to be, with respect to the user device and the topic, in a second mode based on receiving the message indicating the item of information not being stored at the first user device, the second mode being a configuration to stop the eventing system from communicating any subsequent item of information to the user device;

receive, from the user device, a signal to cause the eventing system to switch, with respect to the user device and the topic, from the second mode to the first mode, the first mode to cause the eventing system to communicate, without any further request from the user device, a subsequent item of information to the user device in response to an entry of the subsequent item of information into the information memory;

after a receipt of the first signal, enter, into the memory, a second item of information associated with the topic; and cause a second communication, to the user device, of the second item of information, the second communication being based at least in part on the eventing system being, with respect to the user device and the topic, in the first mode.

24. The system of claim 23, wherein determining the item of information associated with the first topic received at the first user device is not stored, the processor is further configured to determine a capacity of memory at the first user device being insufficient to store the item of information associated with the first topic, and communicate, from the first user device to the eventing system based on the determined insufficient capacity of memory, the message further indicating a rejection of the item of information received at the user device.

* * * * *